Feb. 23, 1954

N. F. MARTIN 2,670,407

DRIVE SYSTEM FOR CRYSTAL PICKUPS

Filed Feb. 17, 1949

INVENTOR.
Norman F. Martin
BY
Clarence J. Loftus
Atty.

Patented Feb. 23, 1954

2,670,407

UNITED STATES PATENT OFFICE 2,670,407

DRIVE SYSTEM FOR CRYSTAL PICKUPS

Norman F. Martin, Fort Wayne, Ind., assignor to The Magnavox Company, Fort Wayne, Ind., a corporation of Delaware Application February 17, 1949, Serial No. 76,899

6 Claims. (Cl. 179—100.41)

Figure 1:
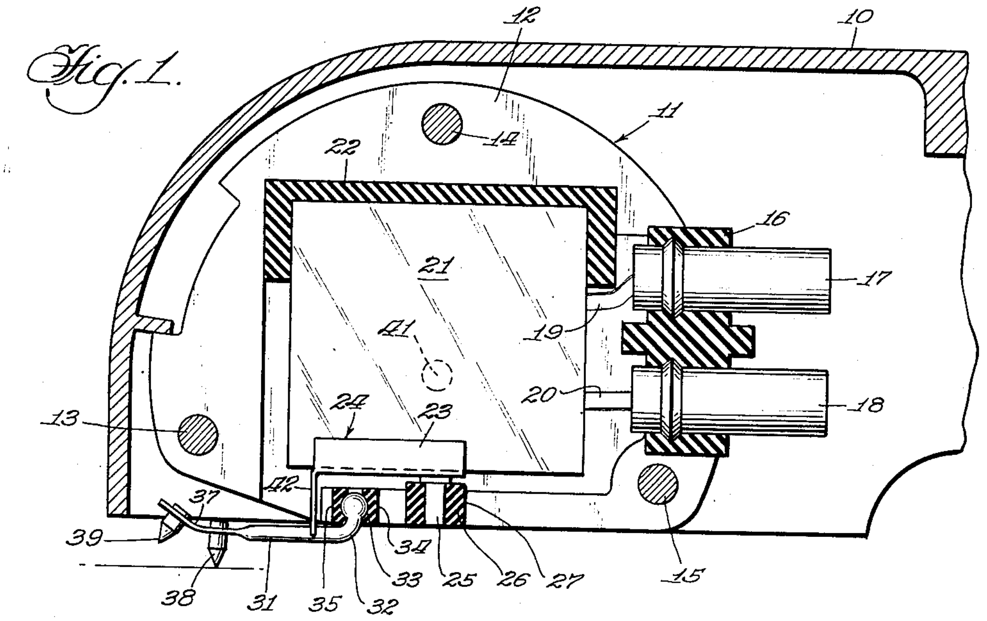

This invention relates to phonograph pickups and is specifically directed to the provision of a novel and improved crystal pickup wherein the playing point of the pickup stylus and the piezo-electric crystal driven thereby are mechanically interconnected in such a manner that the stylus has the degree of lateral compliance required for faithful tracking at a very low tracking weight, yet the vibratory energy imparted to the playing point of the stylus by the record is transmitted to the crystal without substantial loss in the mechanical system of the pickup.

In piezo-electric crystal pickups a problem that has remained unsolved for many years arises from the fact that the inherently stiff and rigid nature of the crystal presents a relatively high mechanical impedance, which does not provide the degree of lateral compliance required to permit the playing point of the stylus to faithfully follow the record groove unless a high tracking weight is employed. It has therefore been common practice to maintain a relatively high tracking weight on the playing point of the stylus or to provide reduction linkages or motion transmitting means having a flexible or resilient connection between the playing point and the crystal, in order that the yieldable nature of the motion transmitting means would provide sufficient compliance for the playing point to follow the groove of the record with some degree of fidelity.

These expedients have had recognized undesirable aspects; however, since if a heavy tracking weight is employed the pickup has a pronounced tendency toward "needle talk" and excessive wear on the record and playing point of the stylus; while if a yieldable connection is used between the stylus and crystal the invariable result is a substantial loss of energy and consequent reduction in voltage output of the crystal. In addition, the inertia and friction incident to movement of the parts ordinarily causes a further decrease in efficiency and an adverse effect on the fidelity obtainable with the device.

It is accordingly the primary object of the present invention to provide the crystal pickup adapted to utilize a conventional crystal of high mechanical impedance, together with a phonograph stylus and playing point so arranged and connected that the playing point is capable of the degree of compliance required for faithful tracking and does not present an unduly high mechanical impedance to the record.

It is a further object of the invention to provide a pickup wherein the parts are so designed, constructed and related to each other that the energy imparted to the playing point of the stylus is transmitted to the crystal without substantial loss whereby maximum efficiency is attained.

It is a further object of the invention to provide a crystal pickup wherein the effective mechanical impedance between the crystal and playing point of the stylus is properly matched to accomplish maximum energy transfer from a stylus having adequate compliance to a crystal of relatively stiff and rigid nature.

An additional object of the invention is to provide a piezo-electric crystal pickup having a stylus consisting of a short, slender wire having a resonant frequency above the range of audibility, with a driving connection consisting of a thin metal strip between the stylus and the crystal so that the operating parts of the device have negligible inertia and will not resonate within the range of frequencies to be reproduced.

These objects are accomplished in the present invention by a novel combination of parts in which the stylus consists of a very short length of slender wire (which need not be over 1/4" in overall length) mounted in a pivot bearing at one end and provided with a permanent or semi-permanent playing point at the other. A stylus of this type is of advantage in several respects. For one thing, its extremely low inertia allows it to track faithfully even at high frequencies. Moreover, it does so without substantial loss of energy due to friction or inertia. In addition, the natural resonance of such a stylus is at a frequency above the audible range and consequently above the range of frequencies to be reproduced so no objectionable characteristics of self-resonance are encountered.

The stylus of the present disclosure is also designed to function as an impedance matching device between the playing point, which should present a relatively low impedance to the record, and the crystal itself, which presents a high impedance. To this end the crystal is not driven directly from the playing point but is provided with a crystal driving member connected to the stylus at a point intermediate the bearing and playing point thereof, so that the stylus acts as a lever, with the portion of the stylus between the bearing and the driving connection comprising a short or interconnected lever. By these expedients it is feasible to transmit substantially the entire amount of energy imparted to the playing point to the crystal and transform it into electrical energy without substantial losses, yet to do this with mechanical instrumentalities capable of giving a fairly flat frequency response throughout the entire range of sounds to be reproduced.

Figure 2:
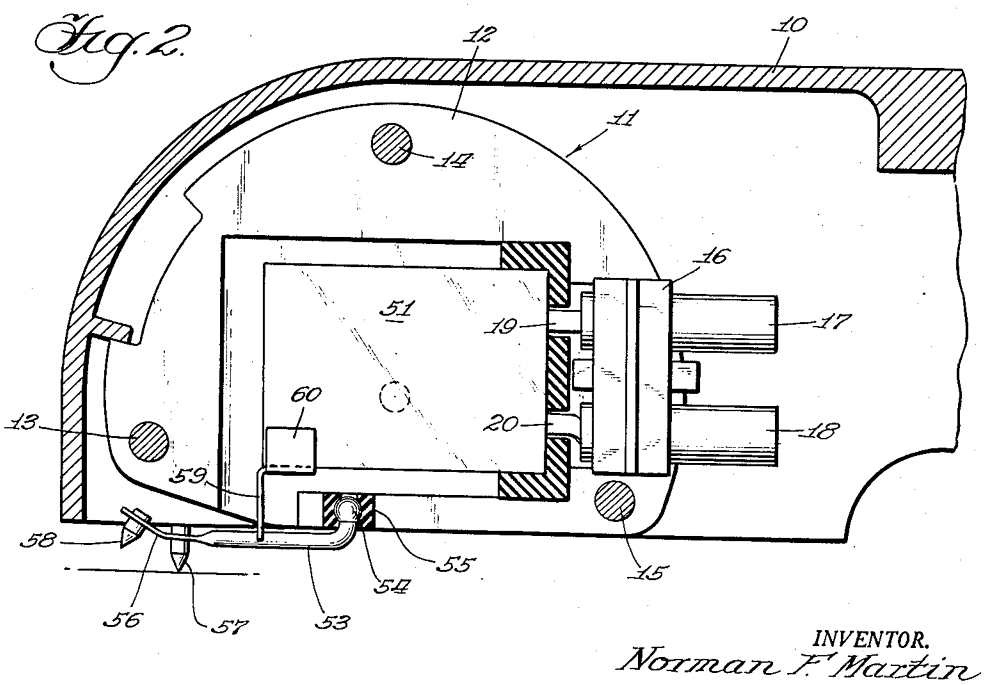

Two somewhat different embodiments of the invention are illustrated in the drawings of this disclosure wherein:

Figure 1 is a cross sectional view of the end of a phonograph tone arm with a pickup cartridge of the form preferred for use with a crystal of the "twister" type; and Figure 2 is a cross sectional view similar to Figure 1 showing the form of the invention presently preferred for use in connection with a crystal of the "bender" type.

In both embodiments of the invention the tone arm 10 is hollow, preferably being constructed of molded plastic. As shown, it is arranged to provide a mounting for a crystal cartridge 11 consisting of a pair of identical and opposite housing portions 12 adjoined by the machine screws or rivets 13, 14 and 15. The housing is provided with an insulating block 16 in which output terminals 17 and 18 are mounted and these terminals are electrically connected to the crystal by leads 19 and 20 in a manner well understood in the art.

In the form of the invention shown in Figure 1 the crystal 21 is mounted in a resilient mounting block 22 and is so oriented that its twisting axis lies on its vertical center line. The lower edge of the crystal is clamped between a pair of opposite flanges 23 on a fitting generally designated as 24. The fitting 24 has a dual function. The righthand portion thereof acts as a mounting for the journal or pivot stud 25, while the lefthand portion functions as a crystal driving member. The journal 25 is supported by a bearing consisting of a resilient sleeve 26 clamped in a suitable socket 27 in the cartridge housing so that the lower edge of the crystal is adequately supported yet may twist on its axis. That is, the crystal is restrained against lateral movement but is capable of unrestricted twisting movement on the axis of the bearings and journal 25.

The stylus 31 of the pickup consists of the short, slender piece of wire having an upwardly curved portion 32 terminating in a ball 33 held in the resilient sleeve 34 which is also clamped in a socket 35 at a point adjacent to the bearing 26 but spaced slightly to the left therefrom as viewed in the drawing. The end of the stylus opposite the stylus bearing has a flattened portion 37 in which one or more stylus tips or playing points 38 and 39 are mounted.

In the precise form of the invention shown it is contemplated that the point 38 may have the tip shaped and dimensioned for use with records of the long playing or "microgroove" type while the tip 39 is suited to use with standard records, so that the two points may be interchangeably used by tilting the entire cartridge around the pivot 41 so that either point may be placed in position to engage the record. It is to be understood, however, that the present specification is not directed to this feature and that the invention here shown and claimed is applicable to the structure shown irrespective of whether one or more playing points are employed. It is of importance, however, to note that the stylus according to these teachings may be a very small piece of slender wire so that its natural resonant frequency will be above the range of audibility and consequently beyond the range of frequencies that the pickup is designed to reproduce, so that the quality of reproduction will not be adversely affected by self-resonant characteristics of the stylus. At the same time this short length of wire (which need not exceed ¼" between the ball 33 and playing point 38) is sufficiently stiff so that vibratory motion imparted to the playing point will not be lost by flexing of the stylus. Instead the energy imparted to the stylus tip will be transmitted upwardly through the thin sheet metal strip 42 from the stylus to the crystal driving member. It follows that substantially all of the energy imparted to the playing point will be effective to flex the crystal. It is to be noted that the strip 42 engages the stylus at a point between the playing point 38 and the stylus bearing. This provides suitable matching between the relatively high mechanical impedance of the crystal and the end of the stylus so that the playing point 38 may have adequate lateral compliance to accomplish faithful tracking in the record groove with a very low tracking weight. Thus the stylus may track faithfully without needle talk and without causing undue record wear.

The form of the invention disclosed in Figure 2 differs from that just described in that it employs a crystal 51 of the "bender" type mounted in a resilient mounting block 52 at the side adjacent the output terminals. The stylus 53 may be of the same general form as the stylus 31 and as shown is provided with a bearing comprising a ball 54 mounted in a resilient sleeve 55 clamped in the cartridge housing. The opposite end of the stylus is flattened at 56 and carries playing points 57 and 58.

The driving connection from the stylus to the crystal is completed through the thin metal strip 59 extending upwardly from the midpoint on the stylus and secured to a crystal driving member having opposite flanges 60 clamped to the lower corner of the crystal 51. The mode of operation of this form of the invention is identical with that of the form shown in Figure 1 with the exception that the energy transmitted to the crystal driving member 60 serves to bend the crystal rather than to twist it.

From the foregoing it will be seen that the teachings of the present invention provide a convenient and simplified means for reconciling the heretofore conflicting characteristics of mechanical impedance encountered in typical crystal pickups, and provide means to successfully match the mechanical impedances of the mechanism so that all of the energy imparted to a playing point having the required degree of compliance may be effectively transmitted to a crystal which is inherently stiff in nature and adapted to only very limited flexing movements. Moreover, this object of the invention is accomplished by the provision of a mechanism of simple mechanical design with the individual parts so arranged and constructed that the unit has no point of self-resonance within the range of sounds to be reproduced. This not only increases the efficiency of the unit and overcomes the difficulties customarily associated with mechanisms having parts of considerable inertia but also prevents the eccentricities of performance normally encountered in any device having a period of mechanical resonance at a frequency within the reproduction range.

The characteristics of compliance, output and frequency response may be varied as required by altering the dimensional relationships of the stylus and driving connection to the crystal and may also be controlled by the use of a stylus pivot bearing which has, in itself, some degree of lateral compliance and resistance, that is, the bearings 34 and 55 may be true pivots if desired, but in certain instances it is advisable to utilize bearing material having considerable inherent resiliency so that these do not function as a true pivot but allow a certain degree of lateral compliance at the pivoted end of the stylus.

It is also to be remembered that while the teachings of this invention find their greatest utility in connection with pickups of the crystal type, yet these teachings are equally applicable to other electro-mechanical transducers and may be used to advantage in any application where the normal mechanical impedance of the transducer unit is higher than the desired mechanical impedance of the stylus tip. It is therefore pointed out that while the invention has been described and illustrated in the present preferred embodiment it is not limited to the precise structure shown and described but extends to any variation or modification thereof within the terms of the appended claims.

Having thus described the invention, I claim:

1. In a phonograph pickup, in combination, a cartridge comprising a housing, a crystal mounting within the housing; a crystal bearing in the housing remote from said mounting; and a stylus bearing remote from the crystal mounting and adjacent the crystal bearing; a piezo-electric crystal fixed in said crystal mounting and supported by said bearing, with a crystal driving member secured to said crystal at a point remote from said mounting; a stylus consisting of a short slender wire having a resonant frequency above the range of audibility, said wire having one of its ends pivoted in the stylus bearing and having a playing point near the other end; and a driving connection consisting of a thin metal strip extending between the stylus and the crystal driving member and engaging the stylus between the playing point and the stylus bearing.

2. In a phonograph pickup, in combination, a cartridge comprising a housing, a crystal mounting within the housing; a crystal bearing in the housing remote from said mounting; and a stylus bearing remote from the crystal mounting and adjacent the crystal bearing; a piezo-electric crystal fixed in said crystal mounting and supported by said bearing, with a crystal driving member secured to said crystal at a point remote from said mounting; a stylus consisting of a short slender wire having a resonant frequency above the range of audibility, said wire being pivoted in the stylus bearing and having a playing point near one end thereof; with a driving connection consisting of thin metal strip between the stylus and the crystal driving member; said connection being spaced from the stylus bearing less than the spacing between the stylus bearing and the playing point.

3. In a phonograph pickup, in combination, a cartridge comprising a housing, a crystal mounting within the housing; and a stylus bearing remote from said crystal mounting; a piezo-electric crystal fixed in said crystal mounting with a crystal driving member secured to said crystal at a point remote from said mounting; a stylus consisting of a short slender wire pivoted in the stylus bearing and having a playing point near one end thereof; and a driving connection between the stylus and the crystal driving member at a point between the ends of the stylus; said connection being spaced from the stylus bearing less than the spacing between the stylus bearing and the playing point.

4. In a phonograph pickup, in combination, a cartridge comprising a housing, a crystal mounting within the housing; and a stylus bearing remote from said crystal mounting; a piezo-electric crystal fixed in said crystal mounting with a crystal driving member secured to said crystal at a point remote from said mounting; a stylus consisting of a short slender wire pivoted in the stylus bearing and having a playing point near one end thereof; and a driving connection between the stylus and the crystal driving member at a point between the ends of the stylus.

5. In a phonograph pickup, in combination, a cartridge comprising a housing, a crystal mounting within the housing; a crystal bearing in the housing remote from said mounting; and a stylus bearing remote from the crystal mounting and adjacent the crystal bearing; a piezo-electric crystal fixed in said crystal mounting and supported by said bearing, with a crystal driving member secured to said crystal at a point remote from said mounting; a stylus having a resonant frequency above the range of audibility pivoted in the stylus bearing and having a playing point near one end thereof; and a driving connection between the stylus and the crystal driving member; said connection being spaced from the stylus bearing less than the spacing between the stylus bearing and the playing point.

6. In a phonograph pickup, in combination, a cartridge comprising a housing, a crystal mounting within the housing; a crystal bearing in the housing remote from said mounting; and a stylus bearing remote from the crystal mounting and adjacent the crystal bearing; a piezo-electric crystal fixed in said crystal mounting and supported by said bearing, with a crystal driving member secured to said crystal at a point remote from said mounting; a stylus pivoted in the stylus bearing and having a playing point near one end thereof; and a driving connection between the stylus and the crystal driving member; said connection being spaced from the stylus bearing less than the spacing between the stylus bearing and the playing point.

NORMAN F. MARTIN.

References Cited in the file of this patent

UNITED STATES PATENTS

| Number | Name | Date |
|---|---|---|
| Re. 20,680 | Sawyer | Mar. 29, 1938 |
| 2,105,011 | Williams | Jan. 11, 1938 |
| 2,181,437 | Norton | Nov. 28, 1939 |
| 2,207,539 | Gravley | July 9, 1940 |
| 2,415,403 | Backman | Feb. 11, 1947 |
| 2,471,601 | Albright | May 31, 1949 |
| 2,518,861 | Burtch | Aug. 15, 1950 |
| 2,564,054 | Dreisbach | Aug. 14, 1951 |
| 2,575,999 | Cordes | Nov. 20, 1951 |